United States Patent
Zhang

(10) Patent No.: US 10,222,881 B2
(45) Date of Patent: Mar. 5, 2019

(54) APPARATUS AND ASSOCIATED METHODS

(71) Applicant: Nokia Technologies Oy, Espoo (FI)

(72) Inventor: Liang Zhang, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 36 days.

(21) Appl. No.: 14/773,092

(22) PCT Filed: Mar. 6, 2013

(86) PCT No.: PCT/CN2013/072226
§ 371 (c)(1),
(2) Date: Sep. 4, 2015

(87) PCT Pub. No.: WO2014/134793
PCT Pub. Date: Sep. 12, 2014

(65) Prior Publication Data
US 2016/0018913 A1    Jan. 21, 2016

(51) Int. Cl.
*G06F 3/0354*      (2013.01)
*G06F 3/0488*      (2013.01)
(Continued)

(52) U.S. Cl.
CPC ........ *G06F 3/03547* (2013.01); *G06F 3/0485* (2013.01); *G06F 3/0488* (2013.01); *H04M 1/72569* (2013.01); *G06F 2203/04808* (2013.01)

(58) Field of Classification Search
CPC .. G06F 3/0488; G06F 3/0485; G06F 3/03547; G06F 2203/04808; H04M 1/72569
See application file for complete search history.

(56) References Cited

U.S. PATENT DOCUMENTS 8,286,104 B1    10/2012    Yonge-Mallo
8,411,060 B1 *    4/2013    Scholler .............. G06F 3/04883
                                                                345/173
(Continued)

FOREIGN PATENT DOCUMENTS

CN      101901079 A      12/2010
CN      102077153 A      5/2011

OTHER PUBLICATIONS

International Search Report and Written Opinion for Application No. PCT/CN2013/072226 dated Dec. 12, 2013.
(Continued)

*Primary Examiner* — Christopher E Leiby
(74) *Attorney, Agent, or Firm* — Alston & Bird LLP

(57) ABSTRACT

An apparatus, the apparatus comprising at least one processor, and at least one memory including computer program code, the at least one memory and the computer program code configured, with the at least one processor, to cause the apparatus to perform at least the following: differentiate between two or more current possible inputs associated with a particular region of a user interface by dynamically assigning respective probabilities to two or more of the current possible inputs, wherein the dynamic assignment of the probabilities is based on at least one or more of: the time between the two or more current possible inputs and one or more previous inputs in the current view; the current view in which the two or more current possible inputs are received; the two or more current possible inputs being received at an edge region of a display showing the current view; and a specific displayed user interface element associated with the particular region, the particular region being an edge region of a display of the user interface.

18 Claims, 7 Drawing Sheets

(51) Int. Cl.
*H04M 1/725* (2006.01)
*G06F 3/0485* (2013.01)

(56) References Cited

U.S. PATENT DOCUMENTS

| | | |
|---|---|---|
| 2009/0327974 A1 | 12/2009 | Abanami et al. |
| 2011/0238612 A1* | 9/2011 | Wilson .................. G06F 3/0481 |
| | | 706/52 |
| 2012/0192108 A1 | 7/2012 | Kolb |
| 2013/0067382 A1* | 3/2013 | Townsend ........... G06F 3/04895 |
| | | 715/773 |
| 2014/0082545 A1* | 3/2014 | Zhai .................... G06F 3/04886 |
| | | 715/773 |
| 2015/0205475 A1* | 7/2015 | Donelan ............... G06F 3/0483 |
| | | 715/784 |
| 2017/0324860 A1* | 11/2017 | Novet ............... H04M 1/72569 |

OTHER PUBLICATIONS

Office Action for corresponding Chinese Application No. 201380076296.9, dated Jan. 29, 2018 with English Summary, 8 pages.

* cited by examiner

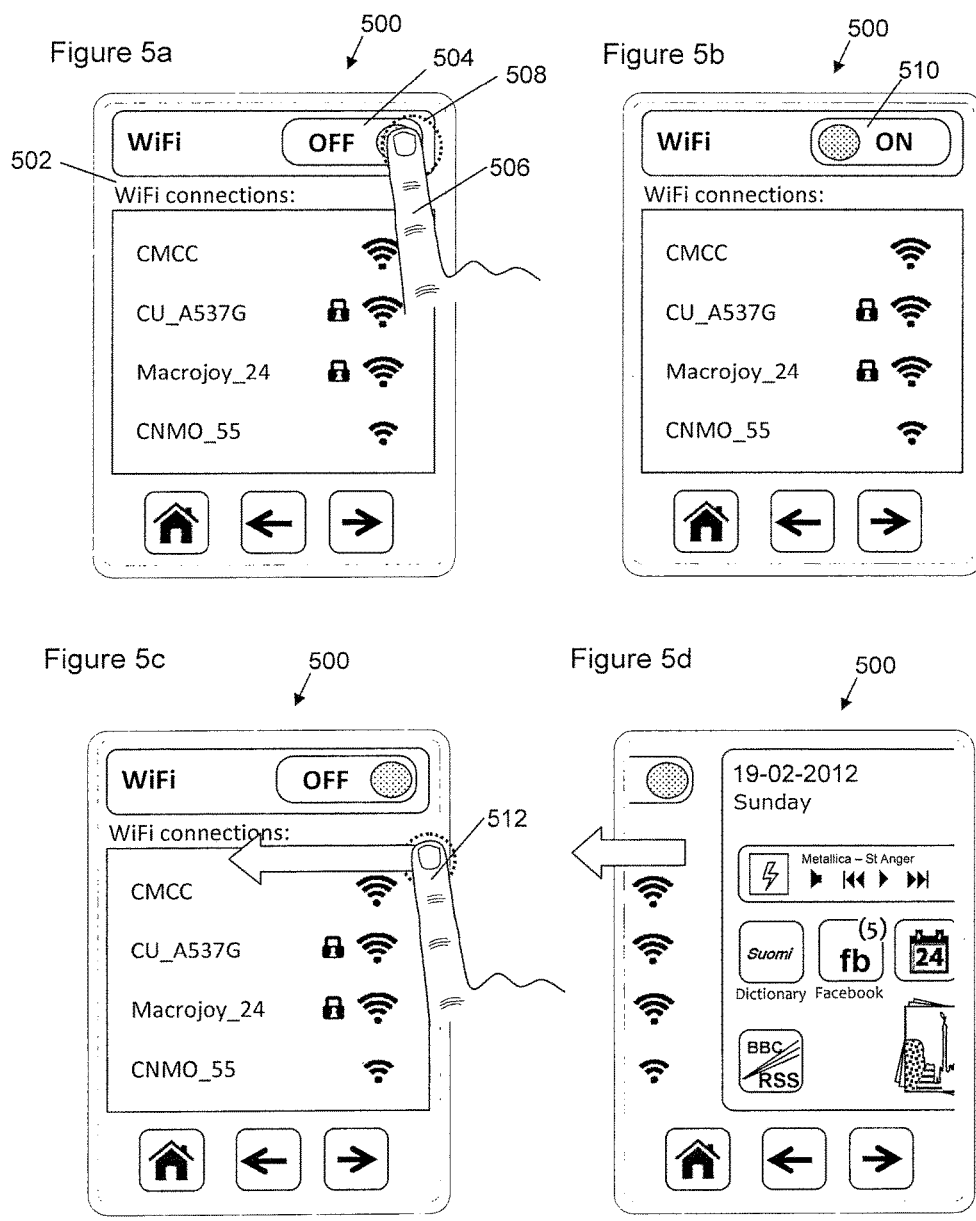

Figure 8a
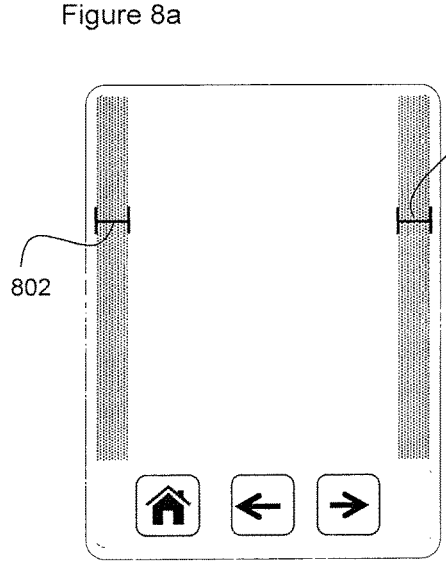
802
802
Figure 8b
| Time interval | Border size |
|---|---|
| > 500 ms | 10 pixels |
| 400 ms – 500 ms | 8 pixels |
| 300 ms – 400 ms | 6 pixels |
| 200 ms – 300 ms | 4 pixels |
| < 200 ms | 0 pixels |
Figure 9a
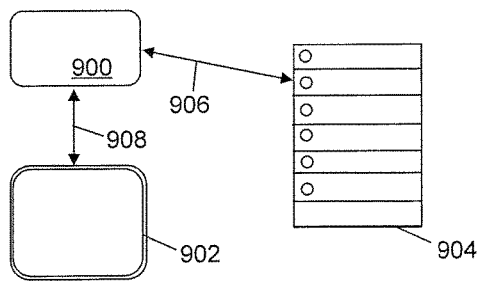
Figure 9b
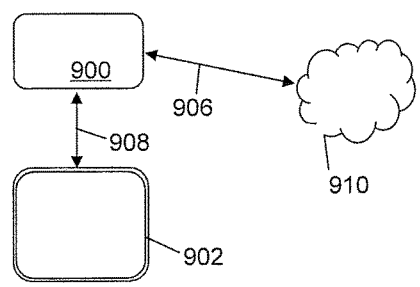

APPARATUS AND ASSOCIATED METHODS

TECHNICAL FIELD

The present disclosure relates to electronic devices, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs), mobile telephones, smartphones and other smart devices, and tablet PCs.

The portable electronic devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/e-mailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Many electronic devices comprise a touch or hover sensitive panel as an input sensor so that a user may provide touch/hover input to the device. Examples include a touch sensitive display screen and a touchpad cursor controller. Other electronic devices allow input to be made via a peripheral device, such as by using a mouse to control a cursor on a display screen. A user may make different inputs using such an input sensor or peripheral device. The different inputs may each be detected as a different type of input/command.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first example aspect there is provided an apparatus, the apparatus comprising at least one processor, and at least one memory including computer program code, the at least one memory and the computer program code configured, with the at least one processor, to cause the apparatus to perform at least the following: differentiate between two or more current possible inputs associated with a particular region of a user interface by dynamically assigning respective probabilities to two or more of the current possible inputs. The dynamic assignment of the probabilities is based on at least one or more of:
  the time between the two or more current possible inputs and one or more previous inputs in the current view;
  the current view in which the two or more current possible inputs are received;
  the two or more current possible inputs being received at an edge region of a display showing the current view; and
  a specific displayed user interface element associated with the particular region, the particular region being an edge region of a display of the user interface.

The above can be considered to be considering the context of the user input to make the dynamic assignment. Thus, the apparatus can advantageously process an ambiguous user input action (such as a touch on a touch-sensitive screen or a mouse click) which can be interpreted in more than one way, e.g., having two or more current possible inputs. The two or more current possible inputs may be considered to be simultaneous as they are the result of one user input action.

For example, a user may be in an address book application and wish to scroll through a list of contact entries in the list. A slide input from a top edge of the display may minimise the address book application. A slide input within the displayed address book application away from an edge region may scroll through the contact entries. A user may be quickly scrolling through the contact entries by providing slide inputs away from the edge of the display. If a user then provides another slide input (a user input action), but from an edge region, how can the apparatus know whether the user wishes to continue scrolling (one possible current user input) or minimise the application (another possible current user input)? The latest user action of a slide input may be interpreted as providing two resulting inputs to the user interface at the same time. In this example, the user input action (slide) may be interpreted as simultaneously providing both a current possible input which closes the application, and a current possible input which continues scrolling through the contact entries. To choose one of the two possible user inputs one of the multiple current possible inputs may be identified as a most probable/intended input to provide the most probable/intended outcome/function.

The apparatus can dynamically assign probabilities to these two current possible input options in this example based on the time between the two or more current possible inputs and one or more previous inputs in the current view, and/or based on the two or more current possible inputs being received at an edge region of a display showing the current view. If the time between the current input and one or more previous inputs is determined to be short, the probability assigned to the input causing a scrolling action may be higher and the probability assigned to the input causing the application to be minimised may be lower, because it is unlikely the user would be scrolling and suddenly decide to minimise the application, and more likely that the user was inaccurate in providing the slide user inputs while quickly scrolling through the contact list.

As another example, a user may be viewing an options menu on a touch sensitive display user interface. A check box may be displayed close to a "close menu" button in a top corner of the menu. If the user provides a touch input located partly over the check box and partly over the "close menu" button, then effectively two possible current inputs have been provided. How can the apparatus know what action to take in response to the touch input? The apparatus can dynamically assign probabilities to these two possible current input options in this example based on a specific displayed user interface element (the check box) associated with the particular region (the top right corner), the particular region being an edge region of the display of the user interface. The apparatus may assign a higher probability to the input checking the check box, and a lower probability to the input closing the menu. In this way if the user really did wish to close the menu, he can easily un-check the check box with one tap on the check box and then close the menu by tapping the "close menu" button. If the apparatus closed the menu, this may be more frustrating for a user who needs to re-load the menu and re-orient himself before continuing his actions. If the apparatus took no action, this may confuse the user who may be unsure why no action resulted from his input (he may think that the touch-sensitivity no longer functioned or that the device had a fault and "crashed", for example).

The apparatus may be configured to perform a function corresponding to the current input with the highest dynamically assigned probability of the two or more of the current possible inputs. Thus from the contact list example above, if the highest probability was assigned to further scroll input, then the menu would continue to be scrolled through.

The apparatus may be configured to assign non-zero probabilities to each of the current possible user inputs. That is, each of the current possible user inputs may be assigned a probability higher than 0 and lower than 1. Thus, from the contact list example above, the current possible input configured to minimise the application may be assigned a probability of 0.05 and the current possible input configured to continue scrolling through contact entries may be assigned a probability of 0.95, for example.

The dynamic assignment of the probabilities may be based on a current view; the current view being an open application, an open settings menu, or a desktop view. Thus the apparatus may be able to differentiate between inputs provided to an open application (such as a gallery application, contact list application, calculator application, for example), an open settings menu (such as menu comprising toggle buttons, check boxes, drop down menus, scroll wheels, sliders and buttons, for example), or a desktop view (which may comprise toolbars, menus, and icons associated with files, applications and shortcuts, for example).

The current possible inputs may comprise one or more respective inputs which would close a current open application, exit the current view, scroll within the current view and toggle functionality provided by the current view. Other possible actions may result from the current possible inputs, such as loading a task manager, minimising an application, moving an application to the background/foreground, selecting a graphical user interface element (such as an icon, button, check box, or menu option for example), or other action within or outside a current open application.

The current possible inputs may comprise an input causing an effect outside the current view or application which, if assigned the highest probability, would close the current open application, exit the current view, or move away from the current view.

The current possible inputs may comprise an input causing an effect within the current view or application which, if assigned the highest probability, would scroll within the current view, toggle a user interface element (such as a toggle switch) within the current view, or actuate a user interface element within the current view (such as opening an application, entering a character associated with a key, selecting an option, or displaying associated information, for example).

The two or more current possible inputs may be: a slide starting from an edge region of a display of the user interface causing one or more of closing the current open application, exiting the current view, or moving away from the current view; and a slide starting within an edge region of a display of the user interface causing one or more of scrolling within the current view, toggling a user interface element within the current view, or actuating a user interface element within the current view.

The two or more current possible inputs may be: a slide starting from within an edge region of a display of the user interface causing one or more of closing the current open application, exiting the current view, or moving away from the current view; and a slide starting on a display within an edge region of a display of the user interface causing one or more of scrolling within the current view, toggling a user interface element within the current view, or actuating a user interface element within the current view. A slide user input may be a swipe user input, or a flick user input, for example.

The apparatus may be configured to differentiate by dynamically assigning respective probabilities based on the time between the two or more current possible inputs and one or more previous inputs in the current view by at least one of:
  increasing the probability assigned to a current possible input causing an effect within the current view as the time decreases;
  decreasing the probability assigned to a current possible input causing an effect within the current view as the time increases;
  increasing the probability assigned to a current possible input causing an effect outside the current view as the time increases; and
  decreasing the probability assigned to a current possible input causing an effect outside the current view as the time decreases.

The use of the time interval between a) the two or more current possible inputs (which are possible results from one user input action/gesture) and b) one or more previous user inputs to dynamically assign probabilities is advantageous. The one or more previous user inputs may be the immediately preceding user input. An average time between two or more previous user inputs may be taken into account in determining the time between the two or more current possible inputs and one or more previous inputs. The time interval may be between the end time of a previous user input and the start time of the user input action associated with the two or more current possible inputs. The time interval may be between the start time of a previous user input and the start time of the two or more current possible inputs.

Using the example of scrolling through a contacts list as discussed above, the apparatus may give more weight to the current input being a scroll input, and less weight to the current input being a "minimise" input, if the time between the current and a previous user input is shorter (for example, the user is not very accurate in making a quick series of inputs using the same slide gesture). The apparatus may give less weight to the current input being a scroll input, and more weight to the current input being a "minimise" input, if the time between the current and a previous user input is longer (the user may have paused after scrolling and then be happy to finish looking at the contact list for the moment).

The apparatus may be configured to differentiate by dynamically assigning respective probabilities based on the time between the two or more current possible inputs and one or more previous inputs in the current view by receiving the two or more current possible inputs at an edge region of a display of the user interface showing the current view.

The apparatus may be configured to differentiate by dynamically assigning respective probabilities based on the time between the two or more current possible inputs and one or more previous inputs in the current view, wherein the one or more previous inputs are made during the same open instance of the current view as the two or more current possible inputs. For example, the apparatus may consider one or more previous inputs made during an open session of an application, or during the time a user is logged on to a computer and a desktop is displayed. After closing the application, or logging out of the computer, the apparatus may re-start the log of previous user inputs upon re-opening the application or logging in again.

The apparatus may be configured to differentiate by dynamically assigning respective probabilities based on the time between the two or more current possible inputs and one or more previous inputs in the current view by receiving the two or more current possible inputs at an edge region of a display of the user interface showing the current view, and dynamically varying the actuable area of the edge region of the display according to the time between the two or more current possible inputs and the immediately preceding previous input by at least one of:

- (e.g., proportionally) increasing the probability assigned to a current possible input causing an effect within the current view as the time between the two or more current possible inputs and the immediately preceding previous input decreases;
- (e.g., proportionally) decreasing the probability assigned to a current possible input causing an effect within the current view as the time between the two or more current possible inputs and the immediately preceding previous input increases;
- (e.g., proportionally) increasing the probability assigned to a current possible input causing an effect outside the current view increases as the time between the two or more current possible inputs and the immediately preceding previous input increases; and
- (e.g., proportionally) decreasing the probability assigned to a current possible input causing an effect outside the current view as the time between the two or more current possible inputs and the immediately preceding previous input decreases.

By varying the region of the display which is considered to be an edge region according to the time interval between current and previous user inputs, the apparatus may give more weight to user inputs being made at the edge region when the time interval is longer, and give less weight to user inputs being made at the edge region when the time interval is shorter. The size of an edge region may negatively correlate with the time interval between previous and current user inputs. Thus as consecutive inputs are made more quickly, the apparatus decreases the size of the edge region and thus is it more likely the input will be recognised as having an effect within a current view and not at an edge region.

The apparatus may be configured to differentiate by dynamically assigning respective probabilities based on the current view in which the two or more current possible inputs are received by at least one of:

- increasing the probability assigned to a current possible input causing an effect within the current view, if the current possible input is an input validly recognised by the current view;
- decreasing the probability assigned to a current possible input causing an effect within the current view, if the current possible input is not an input validly recognised by the current view;
- increasing the probability assigned to a current possible input causing an effect outside the current view, if the current possible input is not an input validly recognised by the current view; and
- decreasing the probability assigned to a current possible input causing an effect outside the current view, if the current possible input is an input validly recognised by the current view.

As an example, an open application may only recognise tap user inputs as valid inputs, and other user inputs such as slides/swipes and double taps may not be recognised by the application. Such other user input may, however, be recognised outside the current application, for example to display a menu or task manager. If the user then makes a user input which is not valid for the open application, the apparatus may not ignore the input (as it is invalid for the application) but the input may be given some weight as an input providing an action outside the open application. The apparatus can dynamically assign probabilities to the possible current user inputs to determine the most likely intended action required by the user.

The apparatus may be configured to differentiate by dynamically assigning respective probabilities based on the two or more current possible inputs being received at an edge region of a display of the user interface showing the current view by assigning a higher probability to a current possible input performing a function within the current view than the probability assigned to a current possible input performing a function outside the current view.

The apparatus may be configured to differentiate by dynamically assigning respective probabilities based on the specific displayed user interface element associated with the edge region of the display of the user interface by assigning a higher probability to a current possible input actuating the user interface element than the probability assigned to a current possible input interacting with the edge region of the display.

The apparatus may be configured to receive an ambiguous user input action, the ambiguous user input action providing the two or more current possible inputs to the user interface.

The two or more current possible inputs may be made via one or more of: a touch input sensor, a hover input sensor, a pointer control device, a mouse, a trackball, a joystick, a wand, a remote controller, and a motion sensor input device. An example of a motion sensor device is a smart television which can be controlled via a motion sensor detecting a user's hand and body gestures at a distance form the television. Such hand gestures may, for example, be used to select icons displayed on the screen, scroll through options/lists, and perform playback options such as rewind, pause, and skip forward.

The apparatus may be configured to differentiate between two or more current possible inputs associated with a particular region of a user interface using Bayes' theorem to dynamically assign respective probabilities to two or more of the current possible inputs. Bayes' theorem uses posterior probability instead of only using the most likely probability as the determining factor when making classification decisions. This may improve the minimum classification error rate and therefore allow for the most likely intended user input of a set of two or more current user inputs to be performed, thereby providing an improved user experience.

The dynamic assignment of the probabilities may be based on an open application as the current view. The open application may be: a gallery application, such as a photograph, image or movie viewing application; a social media application such as a microblog or personal social media page; a web browser, a productivity application such as a word processor, spreadsheet, database, presentation or drawing/graphics application; a media player such as a music player or movie player, and/or the like.

The apparatus may be a portable electronic device, a smartphone, a mobile phone, a laptop computer, a tablet computer, a surface computer, a pen-based computer, a stylus-based computer, a television, a personal digital assistant, a digital camera, a watch, a navigation device, a non-portable electronic device, a monitor/display, a desktop computer, a server, a household appliance, a refrigerator, a cooker, a cooling/heating system, or a module for one or more of the same.

According to a further example aspect, there is provided a method, the method comprising differentiating between two or more current possible inputs associated with a particular region of a user interface by dynamically assigning respective probabilities to two or more of the current possible inputs. The dynamic assignment of the probabilities is based on at least one or more of:

the time between the two or more current possible inputs and one or more previous inputs in the current view;

the current view in which the two or more current possible inputs are received;

the two or more current possible inputs being received at an edge region of a display showing the current view; and a specific displayed user interface element associated with the particular region, the particular region being an edge region of a display of the user interface.

According to a further example aspect, there is provided a computer readable medium comprising computer program code stored thereon, the computer readable medium and computer program code being configured to, when run on at least one processor perform at least the following: differentiate between two or more current possible inputs associated with a particular region of a user interface by dynamically assigning respective probabilities to two or more of the current possible inputs. The dynamic assignment of the probabilities is based on at least one or more of:

the time between the two or more current possible inputs and one or more previous inputs in the current view;

the current view in which the two or more current possible inputs are received;

the two or more current possible inputs being received at an edge region of a display showing the current view; and a specific displayed user interface element associated with the particular region, the particular region being an edge region of a display of the user interface.

A computer program may be stored on a storage media (e.g. on a CD, a DVD, a memory stick or other non-transitory medium). A computer program may be configured to run on a device or apparatus as an application. An application may be run by a device or apparatus via an operating system. A computer program may form part of a computer program product.

Corresponding computer programs for implementing one or more of the methods disclosed are also within the present disclosure and encompassed by one or more of the described embodiments.

According to a further example aspect there is provided an apparatus comprising means for differentiating between two or more current possible inputs associated with a particular region of a user interface by dynamically assigning respective probabilities to two or more of the current possible inputs. The dynamic assignment of the probabilities is based on at least one or more of:

the time between the two or more current possible inputs and one or more previous inputs in the current view;

the current view in which the two or more current possible inputs are received;

the two or more current possible inputs being received at an edge region of a display showing the current view; and a specific displayed user interface element associated with the particular region, the particular region being an edge region of a display of the user interface.

The present disclosure includes one or more corresponding aspects, embodiments or features in isolation or in various combinations whether or not specifically stated (including claimed) in that combination or in isolation. Corresponding means and corresponding function units (e.g., an input differentiator, a dynamic probability assigner, an input device, an output device, an input timer/time recorder) for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:

FIGS. 5a-5d illustrate user inputs to toggle a switch in, and move away from, a settings application according to an embodiment of the present disclosure;

FIGS. 8a-8b illustrate a dynamically varying edge region of a display of a user interface, according to an embodiment of the present disclosure;

FIGS. 9a-9b illustrate apparatus in communication with remote computing elements;

DESCRIPTION OF EXAMPLE ASPECTS/EMBODIMENTS

Figure 1:
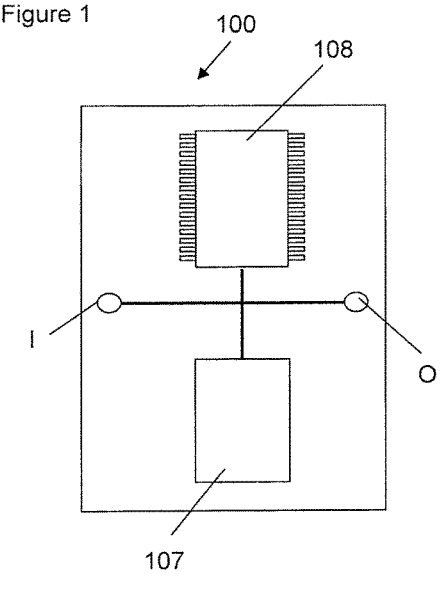
FIG. 1 illustrates an example apparatus embodiment comprising a number of electronic components, including memory and a processor, according to one embodiment of the present disclosure.

Many electronic devices allow user input to be made. For example, portable electronic devices may comprise a touch or hover sensitive panel/display screen for user input. A user may make different gestures which may each be detected by the touch/hover sensitive input device as a different input/command. As another example, user input may be made to a device using a peripheral input device, such as a mouse or joystick used to control a cursor/crosshair on a display screen.

Different types of user gesture may provide different inputs. For example, a device may display a virtual keyboard on a touch-sensitive display. A tap user gesture on a particular key may cause a corresponding character to be input to the device. Providing a swipe user input, as a different type of user gesture, over the same key region may cause a different input causing the keyboard to be removed from display, for example.

Another way to provide different user inputs is to make the same user gesture in different regions of an input sensor or display. For example, a device may be configured with a touch-sensitive display and be running a gallery application. A user may wish to scroll through a series of images in the gallery. The user may swipe in the centre of the display to scroll through the series of images. To close the application, the user may be able to swipe from the edge of the display screen. The same swipe action, beginning at two different locations (edge and non-edge) results in two different inputs. It will be appreciated that the edge region may be, for example, the left, right, top, bottom, or any other edge of the display screen The ability of a device to recognise different user gestures (different types, and/or made at different locations) as different user inputs may allow for flexibility in providing an intuitive user experience and may allow for many different user inputs to be provided using a single input sensor, such as a touch-sensitive screen. However, there may be problems associated with this functionality.

For example, a user may either tap a virtual keyboard key to enter a character or swipe over the keyboard to remove it from display. If the user accidentally swipes while tapping a key (for example, the user's arm is nudged as they make the input), then the user may close the keyboard instead of inputting a character as intended. This can be annoying as the user needs to re-display the keyboard to carry on typing. The user may lose his or her train of thought by having to re-display the keyboard in the middle of typing a word/sentence.

As another example, a user may scroll through images in a gallery application by swiping in the centre of a touch-sensitive display. If the user accidentally swipes from the edge of the display rather than the centre, the gallery application will close because a swipe from an edge of the display is recognised as a "close application" user input. This can be annoying for a user as he or she then needs to re-open the gallery application and re-find the position in the gallery which was displayed before the application closed. This problem may be encountered by a user of a relatively small device, such as a smartphone with a three/four-inch touch-sensitive display, because there is less space on the display in which to discriminate different input locations. This may also be a problem if the user is scrolling using several swipe gestures, as the user's accuracy in making the swipes away from an edge region may decrease as they quickly scroll through the images by repeatedly swiping over the screen. This may also be a problem depending on the particular design of the device, as it may not be obvious to the user where the "edge" is; it could be the edge of the sensing region, the edge of the display region, the edge of the physical device, or the edge of a displayed window. These different edges may or may not coincide depending on the particular device and use circumstances.

Thus it may be advantageous for a device to be configured to detect user gestures as user inputs which the user is more likely to make, if there is a possibility that the user gesture may be determined to correspond to more than one input command.

The current disclosure provides an apparatus configured to differentiate between two or more current possible inputs associated with a particular region of a user interface by dynamically assigning respective probabilities to two or more of the current possible inputs. The dynamic assignment of the probabilities is based on at least one or more of: the time between the two or more current possible inputs and one or more previous inputs in the current view; the current view in which the two or more current possible inputs are received; the two or more current possible inputs being received at an edge region of a display showing the current view; and a specific displayed user interface element associated with the particular region, the particular region being an edge region of a display of the user interface.

FIG. 1 shows an apparatus 100 comprising memory 107, a processor 108, input I and output O. In this embodiment only one processor and one memory are shown but it will be appreciated that other embodiments may utilise more than one processor and/or more than one memory (e.g. same or different processor/memory types). In this embodiment the apparatus 100 is an Application Specific Integrated Circuit (ASIC) for a portable electronic device with a touch sensitive display. In other embodiments the apparatus 100 can be a module for such a device, or may be the device itself, wherein the processor 108 is a general purpose CPU of the device and the memory 107 is general purpose memory comprised by the device. The display, in other embodiments, may not be touch sensitive.

The input I allows for receipt of signalling to the apparatus 100 from further components, such as components of a portable electronic device (like a touch-sensitive or hover-sensitive display) or the like. The output O allows for onward provision of signalling from within the apparatus 100 to further components such as a display screen, speaker, or vibration module. In this embodiment the input I and output O are part of a connection bus that allows for connection of the apparatus 100 to further components. The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more example embodiments, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 107, 108. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
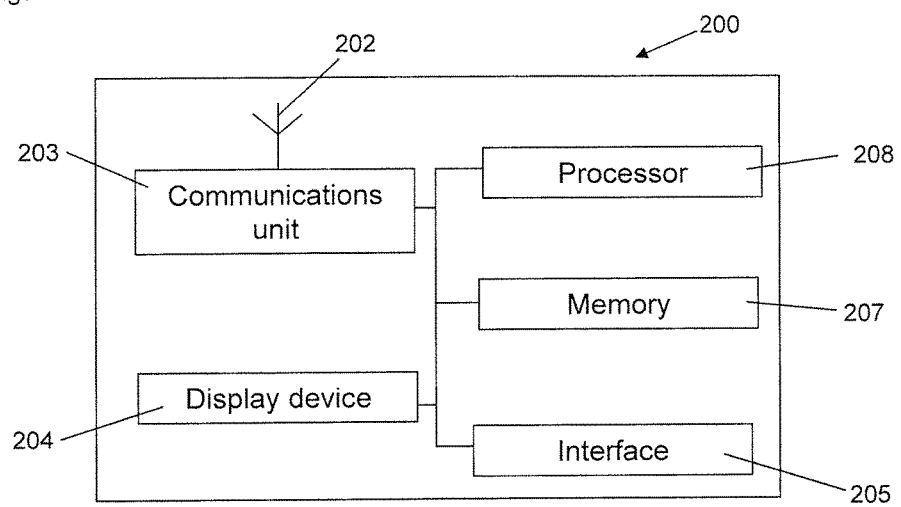
FIG. 2 illustrates an example apparatus embodiment comprising a number of electronic components, including memory, a processor and a communication unit, according to another embodiment of the present disclosure.

FIG. 2 depicts an apparatus 200 of a further example embodiment, such as a mobile phone. In other example embodiments, the apparatus 200 may comprise a module for a mobile phone (or PDA or audio/video player), and may just comprise a suitably configured memory 207 and processor 208.

The example embodiment of FIG. 2 comprises a display device 204 such as, for example, a liquid crystal display (LCD), e-Ink or touch-screen user interface. The apparatus 200 of FIG. 2 is configured such that it may receive, include, and/or otherwise access data. For example, this example embodiment 200 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks. This example embodiment comprises a memory 207 that stores data, possibly after being received via antenna 202 or port or after being generated at the user interface 205. The processor 208 may receive data from the user interface 205, from the memory 207, or from the communication unit 203. It will be appreciated that, in certain example embodiments, the display device 204 may incorporate the user interface 205. Regardless of the origin of the data, these data may be outputted to a user of apparatus 200 via the display device 204, and/or any other output devices provided with apparatus. The processor 208 may also store the data for later use in the memory 207. The memory 207 may store computer program code and/or applications which may be used to instruct/enable the processor 208 to perform functions (e.g. read, write, delete, edit or process data).

Figure 3:
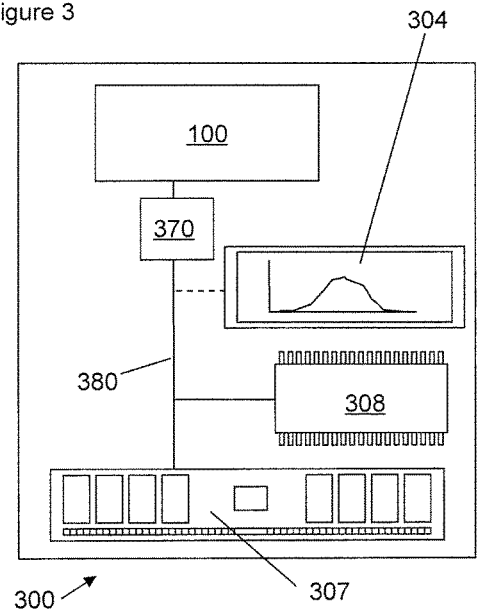
FIG. 3 illustrates an example apparatus embodiment comprising a number of electronic components, including memory and a processor, according to another embodiment of the present disclosure.

FIG. 3 depicts a further example embodiment of an electronic device 300 comprising the apparatus 100 of FIG. 1. The apparatus 100 can be provided as a module for device 300, or even as a processor/memory for the device 300 or a processor/memory for a module for such a device 300. The device 300 comprises a processor 308 and a storage medium 307, which are connected (e.g. electrically and/or wirelessly) by a data bus 380. This data bus 380 can provide an active coupling between the processor 308 and the storage medium 307 to allow the processor 308 to access the computer program code. It will be appreciated that the components (e.g. memory, processor) of the device/apparatus may be linked via cloud computing architecture. For example, the storage device may be a remote server accessed via the internet by the processor.

The apparatus 100 in FIG. 3 is connected (e.g. electrically and/or wirelessly) to an input/output interface 370 that receives the output from the apparatus 100 and transmits this to the device 300 via data bus 380. Interface 370 can be connected via the data bus 380 to a display 304 (touch-sensitive or otherwise) that provides information from the apparatus 100 to a user. The display 304 can be part of the device 300 or can be separate. The device 300 also comprises a processor 308 configured for general control of the apparatus 100 as well as the device 300 by providing signalling to, and receiving signalling from, other device components to manage their operation.

The storage medium 307 is configured to store computer code configured to perform, control or enable the operation of the apparatus 100. The storage medium 307 may be configured to store settings for the other device components. The processor 308 may access the storage medium 307 to retrieve the component settings in order to manage the operation of the other device components. The storage medium 307 may be a temporary storage medium such as a volatile random access memory. The storage medium 307 may also be a permanent storage medium such as a hard disk drive, a flash memory, a remote server (such as cloud storage) or a non-volatile random access memory. The storage medium 307 could be composed of different combinations of the same or different memory types.

FIGS. 4a-4d illustrate an example embodiment of a portable electronic device 400 with a touch sensitive display screen 402, such as a smartphone, a tablet computer or surface computer. The display 402 is a touch-sensor and so provides a user interface. The display screen 402 is currently displaying an open gallery application. A user wishes to flick through some thumbnail images 404 of holiday photographs. The centrally displayed thumbnail image in this example is displayed larger than two "preview" thumbnail images displayed to either side of the central image. The name of the image folder 406 with the number of images (243 images) in that folder which may be scrolled through is also displayed.

In this example, the apparatus/device is configured to allow different types of user input, and to provide different functions based on the location of a user input. In particular, the apparatus is configured to detect a slide starting from an edge region of the display 402 of the user interface as a user input causing the current open application to be closed. Also, a slide starting on the display 402 within an edge region of a display of the user interface can be detected and cause scrolling within the current view, so that the different images 404 in the gallery may be browsed through.

Figure 4A:
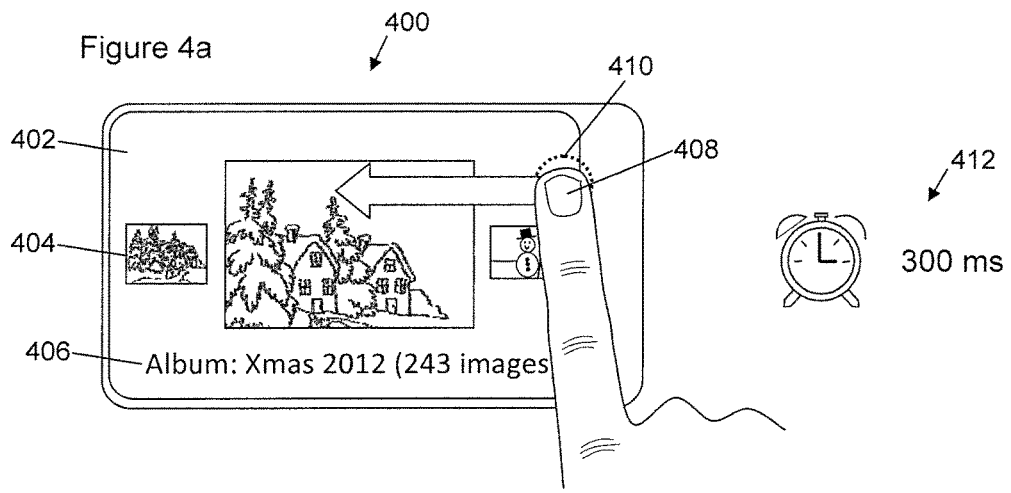
FIGS. 4a-4c illustrate user inputs to scroll through and close a gallery application according to an embodiment of the present disclosure.

In FIG. 4a, the user has previously swiped several times (for example, eight times) from right to left within the display 402 (away from any edges) to quickly scroll through the images 404. FIG. 4a shows a user making a current user input 408 300 ms 412 after the previous slide user input. The current user input 408 is a slide starting from a location 410 which is at an edge region of the display 402. In this example, the user does not intend to close the application. The user was scrolling through the images 404 and provided an "inaccurate" user input 404 to continue scrolling, which was closer to the edge of the display 402 than intended (and previously provided).

The apparatus 400 is configured to differentiate between two or more current possible inputs associated with a particular region of a user interface. Two current possible inputs here are an input to continue scrolling, and an input to close the gallery application. The apparatus aims to resolve the ambiguity of the current user input gesture by determining a most likely intended user input and performing a corresponding function.

The apparatus is configured to dynamically assign respective probabilities to the two current possible inputs. Of course in other examples there may be more than two current possible inputs. The dynamic assignment of the probabilities in this example is based on two factors: the time, 300 ms 412, between the two current possible inputs and the previous inputs made in the current view, and the two current possible inputs being received at an edge region 410 of the display 402 showing the current view.

The apparatus is configured to differentiate between the possible user inputs provided by the swipe 408 at the edge region 410, by dynamically assigning respective probabilities to each user input to increase the probability assigned to a current possible input causing an effect within the current view (scrolling through images) as the time between the current and previous user inputs decreases. It follows that the dynamic assignment decreases the probability assigned to a current possible input causing an effect outside the current view (close the gallery application) as the time decreases.

Thus the apparatus effectively takes account of the previous eight swipes which the user made within the display 402 and the time between the previous swipe and current swipe being 300 ms 412. The apparatus gives more weight (assigns a higher probability) to the user input causing a scroll function, as this is the same function which was provided in response to the previous eight user scroll inputs, the last of which was made a short time (300 ms 412) ago. The apparatus therefore gives less weight (assigns a lower probability) to the user input causing the application to close, because the time between the previous and current user input was a relatively short time, 300 ms 412, and it is unlikely that the user would provide a user input to close the application in such a short space of time after having interacted within the application (to scroll through images).

Figure 4B:
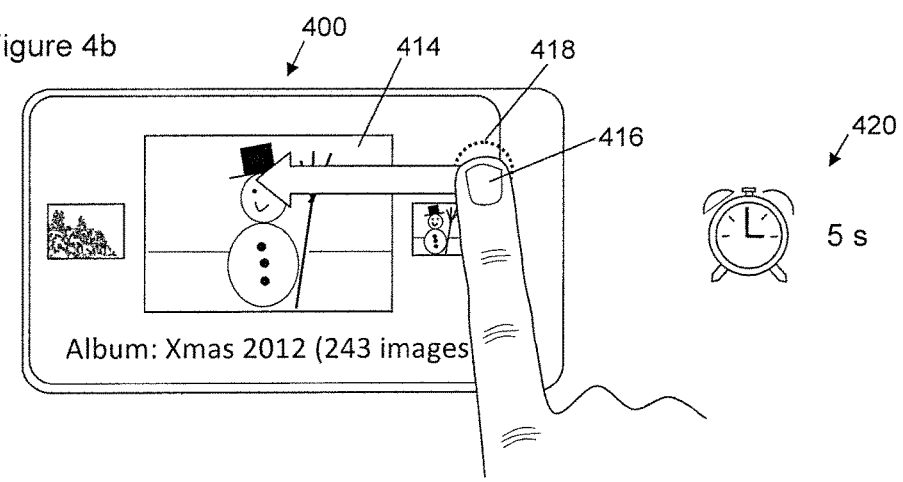

In FIG. 4*b*, the user has viewed an image of interest 414 in the gallery and now wishes to close the application. FIG. 4*b* shows a current user gesture 416 made 5 s 420 after the previous slide user gesture 408. The current user gesture 416 is a slide starting from a location 418 which may be considered to be at an edge region of the display 402. The current user gesture 416 may be considered to provide two current possible user inputs as before—a scroll input or a close application input.

The apparatus is configured to differentiate between the two current possible user inputs provided by the swipe 416 at the edge region 410 as before. However, this time the apparatus has different factors to account for. While the slide user gesture 416 was made in approximately the same location as the previous user gesture 408, the time interval between the two gestures is much longer, at 5 s 420. The time interval between user gestures/inputs 416, 408 has increased from 300 ms 412 to 5 s 420. The apparatus is configured to dynamically assign respective probabilities to each user input to decrease the probability assigned to a current possible input causing an effect within the current view as the time increases, and increase the probability assigned to a current possible input causing an effect outside the current view as the time increases.

Thus the apparatus effectively takes account of the previous swipe which was made 5 s 420 ago and the eight swipes prior to that which were made more quickly in succession. The apparatus gives more weight (assigns a higher probability) to the user input causing a close application function, as the user in less likely to wish to continue scrolling after a 5 s 420 pause and still provide an "inaccurate" user gesture from the edge of the display 402. When the user was scrolling, the time between successive inputs was much quicker than 5 s. The user is now more likely to have made the user gesture 416 from the edge of the display 402 to deliberately to close the application. The apparatus therefore gives less weight (assigns a lower probability) to the user input causing a scroll function within the open application.

Figure 4C:
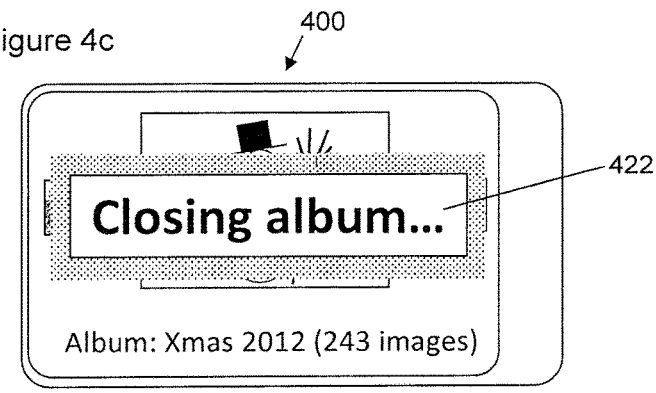

FIG. 4*c* shows that the application is closing 422 in response to the user input 416, because closing the application is the function corresponding to the current input 416 with the highest dynamically assigned probability of the two or more of the current possible inputs (scrolling and closing the application).

The dynamic variation in probability assignment in this example may be summarised as shown in the following table:

| | | |
|---|---|---|
| Time between the two or more current possible inputs and one or more previous inputs in the current view | Decreases | Increases |
| Probability assigned to a current possible input causing an effect within the current view | Increases | Decreases |
| Probability assigned to a current possible input causing an effect outside the current view | Decreases | Increases |

FIGS. 5*a*-5*d* illustrate an example embodiment of a portable electronic device 500 with a touch sensitive display screen 502 which provides a user interface. The display screen 502 is currently displaying an open settings menu/application. A user wishes to toggle the Wi-Fi toggle switch 504 to switch Wi-Fi functionality on for the device 500. The Wi-Fi toggle switch 504 is located close to the edge of the display 502.

In this example as in FIGS. 4*a*-4*d*, the apparatus/device 500 is configured to allow different types of user input and provide different functions in response. In particular, the apparatus is configured to detect a slide starting from an edge region of the display 502 of the user interface as a user input causing the current displayed desktop to be switched to another desktop. Also, a slide starting on the display 502 on a toggle switch 504 moving in the direction for toggling the switch 504 will cause the switch 504 to toggle.

In FIG. 5*a*, the user slides a finger 506 to the left from the right edge of the display 502 over the toggle button 504 which is currently indicating "Wi-Fi OFF". This user gesture 506 provides two possible current user inputs due to the location of the switch 504 on the display, since the input 506 was made in a region 508 of the display 502 corresponding to both the edge of the display 502 and to the location of the toggle button 504. Other factors may also cause the detection of two or more possible current user inputs from a user gesture 506, such as the determined location 508 of the user gesture 506 starting location covering both the switch 504 and edge region (if the user has a large fingertip, for example), or the size of the display 502 being relatively small (such as for a 3 inch smartphone display screen, for example). In this example, the user does not intend to switch desktops, but the user wishes to switch Wi-Fi functionality on using the toggle switch 504.

The apparatus aims to resolve the ambiguity of the current user input gesture 506 by determining a most likely intended user input and performing a corresponding function. The apparatus 500 is configured to differentiate between two or more current possible inputs associated with a particular region 508 of a user interface, by dynamically assigning respective probabilities to the two current possible inputs ("toggle" input and "switch desktop" input). The dynamic assignment of the probabilities is based on the two current possible inputs being received at an edge region 508 of a display 502 showing the current view, and a specific displayed user interface element (the toggle switch 504) which is associated with a particular region 508 at an edge region of a display 502 of the user interface.

The apparatus assigns a higher probability to a current possible input performing a function within the current view (that is, toggling the switch 504) than the probability assigned to a current possible input performing a function outside the current view (that is, switching desktop). It may be said that the dynamic variation in probability assignment causes a higher probability to be assigned to a current possible input actuating a user interface element (switch 504) than the probability assigned to a current possible input interacting with the edge region of the display (in this example, to switch desktop).

Thus the apparatus effectively considers that the user is more likely to want to toggle the switch 506 than change desktops. Even though the user gesture 506 was made from an edge region, the particular location at the edge region 506 also includes a region over the toggle switch 504. The apparatus gives more weight (assigns a higher probability) to the user input causing the toggle switch 504 to be moved, because to move the toggle switch 504 a gesture must be made in a region corresponding to the displayed switch 504. The apparatus therefore gives less weight (assigns a lower probability) to the user input causing the desktop to switch, because it is possible for the user to provide the same user gesture of a swipe, but at a location on the edge of the display away from an interactive element (such as a toggle switch) and cause the desktop to switch. It is considered less likely that the user would wish to switch desktops, and more likely that the user wants to toggle the switch 504, if the user provides a user gesture in the same location as the displayed switch (which happens to be at the edge of the display 502).

The apparatus may be considered to perform the "least inconvenient" action for the user in this situation of two or more inputs being possible. If the user did want to switch desktops, it would be a simple matter to switch the toggle switch back to the original position (because the slide user gesture from right to left starting from a region away from the edge of the display which is required to perform this function would be detected as providing only one user input). The user may then provide another user gesture to switch desktops but the user may be more careful to provide the gesture away from any other interactive elements (such as the switch 504) to ensure that a "change desktops" input is detected. On the other hand, if the user's gesture to move the toggle switch 504 was detected as an input to switch desktops (because it was made from a edge of the display), this action may be disorienting for the user as it unexpectedly changes the information displayed, and may be frustrating as the user needs to switch back to the previous desktop and try and toggle the switch again (with potentially the same "desktop switch" input being detected again).

In FIG. 5b, the toggle switch 510 has been moved to the "Wi-Fi ON" position. In contrast to FIG. 5a, FIG. 5c shows that the user now wishes to switch desktop, and provides a user gesture 512 sliding from the edge of the display 502 but the gesture is not located over an interactive element, such as a toggle switch 504 (or check box, or other actuable displayed element). There is only one user input detected, that of switching the desktop. FIG. 5d shows that the user gesture 512 caused the desktop to switch.

Of course, after detection of switching on the Wi-Fi, as per FIG. 5b, if the user then swiped back from left to right to switch off the Wi-Fi, and then performed a further swipe from right to left over the user interface element 504 (or continued the same swipe moving from the right edge to the left), this input may be detected as a swipe to switch the desktop, rather than to turn on the Wi-Fi again. That is, in response to the second (and third) swipe, a higher probability is given to the input switching the desktop view in this case. The apparatus considers the previous user input in determining the function which the user intended to obtain with the second (and third) swipe.

FIGS. 6a-6d illustrate an example embodiment of a portable electronic device 600 with a touch sensitive display screen 602 (providing a user interface) and calculator functionality. A user wishes to perform a calculation, and then close the application by sliding a finger from the edge of the display 602 (a gesture which provides a "close application" input).

Figure 6A:
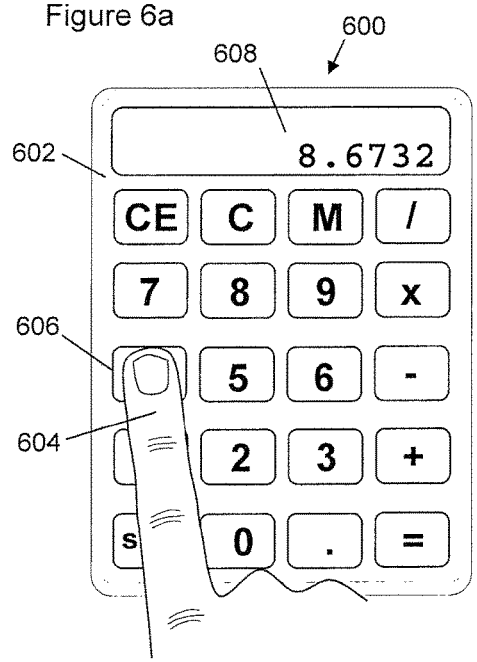
FIGS. 6a-6d illustrate user inputs to enter a number into a calculator application, and close the application, according to an embodiment of the present disclosure.

In FIG. 6a, the user 604 taps a region over the "4" key 606 intending to enter a number "4" into the current displayed number entry 608. The user gesture 606 is made in a region which covers both the edge region of the display 602 and the displayed "4" key 606 which is located close to the edge region.

The calculator application is configured such that only single tap user entries are recognised as providing a valid user input to the application (for example, so that the "virtual" calculator application provides a user experience similar to that of using a physical calculator).

The apparatus is configured to differentiate between the possible user inputs provided by the tap 604 at the edge region based on the current calculator view, by dynamically assigning respective probabilities to each user input, to increase the probability assigned to a current possible input causing an effect within the current view, if the current possible input is an input validly recognised by the current view. Thus the apparatus is configured to decrease the probability assigned to a current possible input causing an effect outside the current view if the current possible input is an input validly recognised by the current view.

Figure 6B:
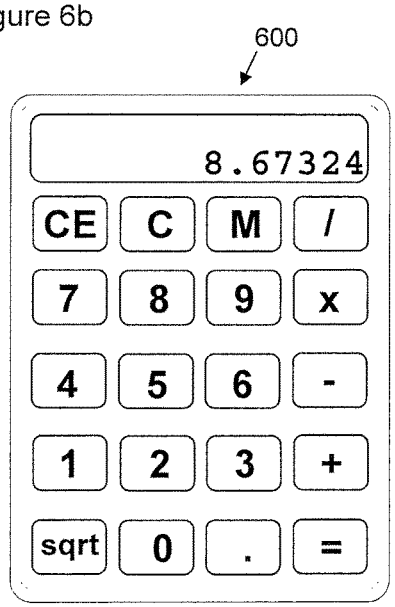

A tap is a valid input within the calculator application, so the probability of the tap 604 causing an effect outside the current application (that is, closing the currently open application) is decreased. Thus even though the tap 604 was detected at a region over the edge and the "4" button 606, the apparatus places more weight on the input being intended as a tap on the button 606 (since a tap is a valid input for this application) and not at the edge. Less weight is placed on the input being made outside the application but intended as a slide rather than a tap. The probability of the tap 604 causing an effect within the current application (such as selecting the key closest to the swipe start position) is increased. As a result, as shown in FIG. 6b, the number "4" has been entered at the end of the current displayed number entry 608. The apparatus assigns probabilities to the intended function of the user input based on the location and the types of valid input allowed for the particular application. Rather than consider the input to be made with an incorrect gesture (tap rather than slide) at the correct place (edge), the apparatus consider the input to be made at the correct place (button) with the correct valid input type (tap).

Figure 6C:
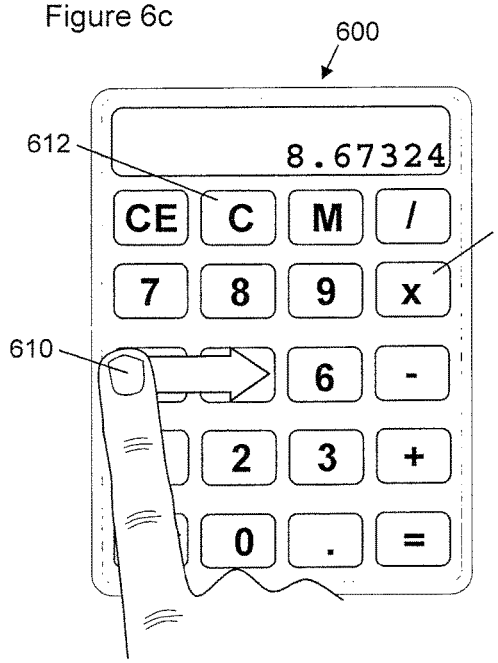

In FIG. 6c, the user provides a slide user gesture 610 intending to close the calculator application. The "4" key is displayed close to the edge of the display 602. The slide user gesture was made at the left edge of the "4" key. In this example virtual keys such as the "4" key 606 are displayed close to most of the edge regions.

The apparatus 600 is configured to differentiate between two or more current possible inputs associated with a particular region of a user interface. Two current possible inputs here are a slide input to close the current open application, and an input to provide a number or command (e.g., cancel 612, multiply by 614) via a virtual key to the calculator application. The apparatus aims to resolve ambiguity of the current user input gesture 610 being associated with two possible current inputs, by determining a most likely intended user input and performing a corresponding function.

The apparatus is configured to dynamically assign respective probabilities to the two current possible inputs. The dynamic assignment of the probabilities is based on the current view in which the two current possible inputs are received (that is, the calculator application); the two current possible inputs being received at an edge region of a display 602 showing the current view; and based on a specific displayed user interface element (the "4" key 606) associated with the particular region which is an edge region of the display 602 of the user interface.

The apparatus is configured to differentiate between the possible user inputs provided by the swipe 610 at the edge region based on the current calculator view by dynamically assigning respective probabilities to each user input, to decrease the probability assigned to a current possible input causing an effect within the current view if the current possible input is not an input validly recognised by the current view. Therefore the probability assigned to a current possible input causing an effect outside the current view is increased if the current possible input is not an input validly recognised by the current view.

Figure 6D:
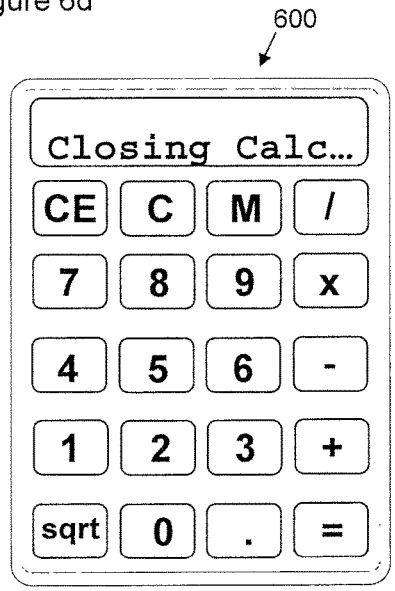

A swipe is not a valid input within the calculator application, so the probability of the swipe 610 causing an effect outside the current application (closing the currently open application) is increased, and the probability of the swipe 610 causing an effect within the current application (selecting the "4" key) is decreased. The apparatus assigns probabilities to the intended function of the user input based on the location and the types of valid input allowed for the particular application. Rather than consider the input to be made with an invalid input gesture (slide rather than tap) at the correct place (button), the apparatus consider the input to be made at the correct place (edge) with the correct input type (slide). FIG. 6*d* therefore shows the swipe was detected as a "close application" input and the calculator application closes.

This dynamic variation in probability assignment in relation to validly made inputs may be summarised as shown in the following table:

| Is the current possible input an input validly recognised by the current view? | Yes | No |
|---|---|---|
| Probability assigned to a current possible input causing an effect within the current view | Increases | Decreases |
| Probability assigned to a current possible input causing an effect outside the current view | Decreases | Increases |

Figure 7A:
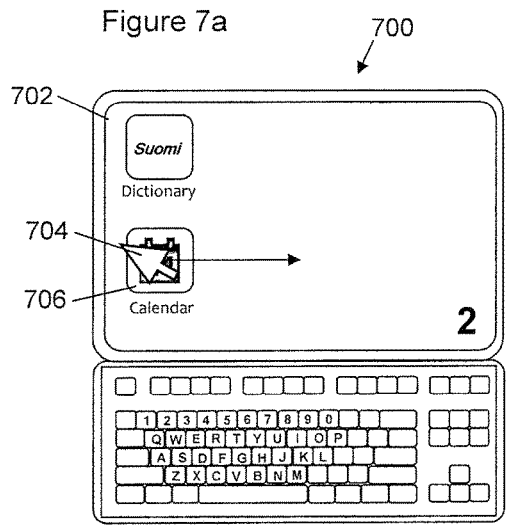
FIGS. 7a-7c illustrate user inputs to view files within a folder on a desktop, and change desktop, according to an embodiment of the present disclosure.
Figure 7B:
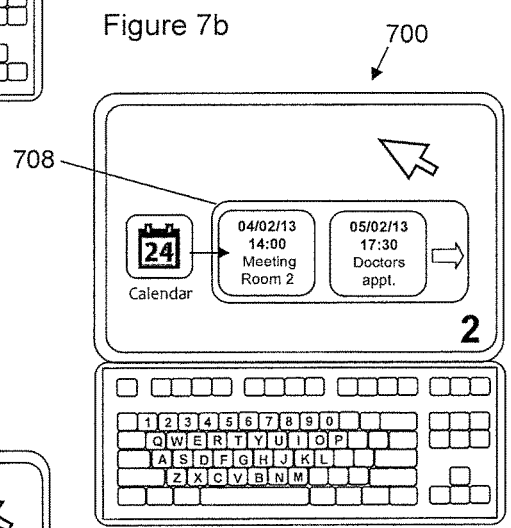
Figure 7C:
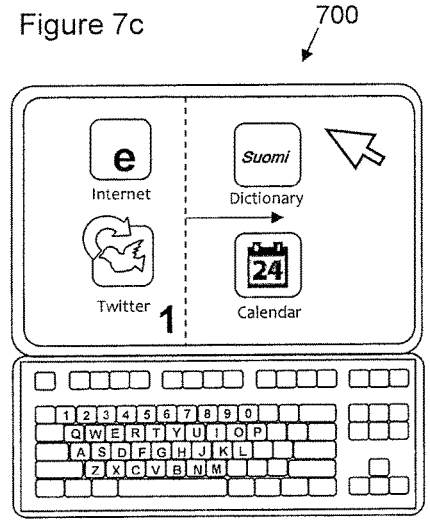

FIGS. 7*a*-7*c* illustrate an example embodiment of a desktop computer 700 with a monitor 702 on which a cursor 704 is controlled by an external device (which may be a mouse, joystick, remote controller, or other cursor controller). The current view is a desktop (number "2") with icons (and which may contain other user interface elements such as buttons, menus, widgets and folders).

A user wishes to see what appointments are due in a calendar application, for which a calendar icon 706 is located on desktop "2". In this example, viewing upcoming appointments is possible by clicking and dragging from the calendar icon 706 across the display screen using the cursor 704. Similarly, it is also possible in this example to peek inside folders and other applications using a click-and-drag action (for example, to view upcoming calendar entries, files inside folders, status updates for social media applications, recent e-mails in an e-mail application). Further, in this example a user may switch between desktops by clicking and dragging from the edge of the display 702 to "pull" the preceding/next desktop into view.

Similarly to the example in FIGS. 4*a*-4*c*, the calendar icon is located close to the left edge of the display screen. By starting the click-and-drag action close to the left edge of the calendar icon 706, the action also starts at the edge of the current desktop. Two possible current user inputs have been made, to preview the calendar entries, and to switch desktops.

The apparatus is configured to differentiate between the possible user inputs provided by the click-and-drag starting at a region comprising both the calendar icon 706 and an edge region, by dynamically assigning respective probabilities to each user input to increase the probability assigned to a current possible input causing an effect within the current view (previewing calendar applications), and therefore to decrease the probability assigned to a current possible input causing an effect outside the current view (switch current desktops). Similarly to the example of FIGS. 5*a*-5*d* this is a "least harm" approach, as the preview pop-up 708 (shown in FIG. 7*b*) may easily be closed and the user can switch desktops again using a gesture away from any other actuable elements (such as folders or icons). If the "switch desktop" input was actioned instead, then this may be annoying for the user who would need to switch back and make another input to view the calendar entries (with the same problem of the input possibly causing the desktop to switch).

The apparatus may take account of previous user inputs made to the current view. Thus in the case where a user rarely switches desktop but often previews items associate with a desktop icon/folder using a click-and-drag action, the apparatus may be configured to use a historical log of previous user inputs. If a user has previously performed, for example, two user inputs to switch desktops and 73 inputs to preview/peek within applications and files from desktop icons, then more weight may be given to user inputs causing a "peek" input and less weight given to inputs causing the desktop to switch in the event of a user gesture causing two (or more) current possible inputs to be detected. "Previous" inputs may be considered from the period of an application being open, or in the case of a desktop, for the period of the computer being switched on or logged into, for example, or of previous inputs over a plurality of instances of the same.

In FIG. 7*c*, similarly to FIG. 5*d*, the user does now wish to switch desktop, and so provides a click-and-drag action which is located at an edge region but which is not located over or close to a user interface element (such as an icon). The user input causes the desktop to be switched to desktop "1" as shown.

FIGS. 8*a* and 8*b* illustrate how the edge region may be defined. The definition of an edge of a sensor region, such as a touch-sensitive display, hover-sensitive pad or motion-detecting monitor, for example, can be unclear to a user. There may be nothing on the sensor region to visually distinguish the edge from a non-edge region. It may be difficult for a user to judge where the edge region is (in the example of a motion sensitive monitor the user may not know where in space to begin a hand gesture corresponding to the edge of the screen). It may be unclear to a user which edge is taken into account for user inputs: an edge of a visible display, an edge of a sensing region, a physical edge of a device, or an edge of a display window/application.

In certain examples as discussed above, it may be useful to determine whether a user gesture starts away from an edge region of an input sensor or whether the user gesture starts at an edge region, because the start, or "touch-down" position, for an input sensor panel may determine the input provided by the user gesture. The difference in location between, for example, a user gesture "touch-down" on a toggle switch (to move the switch) or at the edge of the display (to change homescreen, for example) may be very small.

FIGS. 8a-8b illustrate the dynamic variation of the actuable area of an edge region of the display according to the time between the two or more current possible inputs and the immediately preceding previous input. The apparatus may consider a smaller edge region when the previous and current user inputs are made very quickly one after the other, and consider a larger edge region when the previous and current user inputs are made more slowly one after the other. Thus the apparatus assigns probabilities to the current user inputs by varying the region which is considered to be the edge region and so a smaller probability is assigned to an input at an edge region for a smaller edge region and vice versa.

FIG. 8a illustrates the region 802 which may be considered an edge region (from which a slide user input causes the current view to be changed). FIG. 8b shows an example of varying edge region size with time interval between previous input and current inputs. If the time between the previous user input and the current user inputs is greater than 500 ms, the edge region has the largest width at 10 pixels wide. For time intervals between 400 ms and 500 ms, the edge region is 8 pixels wide. For time intervals between 300 ms and 400 ms, the edge region is 6 pixels wide. For time intervals between 200 ms and 300 ms, the edge region is 4 pixels wide. For time intervals less than 200 ms there is considered to be no edge region, and thus a user input cannot be made at the edge region when consecutive user inputs are separated by less than 200 ms. Of course these values are an illustrative example and the values may be different to those above, user-configurable, and/or application-specific, for example. In another example embodiment the time interval may be a calculated average time between two or more previous inputs. For example the average time interval between the eight previous user inputs may be taken into account in defining the edge/border region width/area.

The apparatus in this example is configured to differentiate between the current user inputs by dynamically assigning respective probabilities based on the time interval between the two or more current possible inputs and one or more previous inputs in the current view. The apparatus varies the size of an edge region based on the time interval. As the time between the two or more current possible inputs and the immediately preceding previous input decreases, the apparatus will increase the probability assigned to a current possible input causing an effect within the current view. This is shown in FIGS. 8a and 8b by the width of the edge region (which may be associated with user input causing an effect outside the current view) decreasing in size, thereby increasing the probability of the user input being within the application and away from an edge region as the time interval decreases and the consecutive user input speed increases.

This effect may also be considered to be the apparatus (e.g., proportionally) decreasing the probability assigned to a current possible input causing an effect within the current view as the time between the two or more current possible inputs and the immediately preceding previous input increases, (e.g., proportionally) increasing the probability assigned to a current possible input causing an effect outside the current view increases as the time between the two or more current possible inputs and the immediately preceding previous input increases, and (e.g., proportionally) decreasing the probability assigned to a current possible input causing an effect outside the current view as the time between the two or more current possible inputs and the immediately preceding previous input decreases. This dynamic variation in probability assignment may be summarised as shown in the following table:

| Time between the two or more current possible inputs and one or more previous inputs in the current view (the two or more current possible inputs are received at an edge region of a display of the user interface showing the current view) | Decreases | Increases |
|---|---|---|
| Probability assigned to a current possible input causing an effect within the current view | (e.g., Proportionally) Increases | (e.g., Proportionally) Decreases |
| Probability assigned to a current possible input causing an effect outside the current view | (e.g., Proportionally) Decreases | (e.g., Proportionally) Increases |

In other words, the edge region is smaller for faster consecutive inputs to weight the current user input being within the application rather than outside it if two current user inputs are detected, one within and one outside the current view (i.e., one at the edge region and one not within and away from the edge region). The edge region is larger for slower consecutive inputs to weight the current user input being outside the application rather than within it One method of determining whether or not a user provides an input starting at an edge region or a non-edge region of a sensor panel is to use Bayes' theorem. Bayes' theorem may be used to more accurately determine how to make a more likely classification based on observation data (for example, of the gesture touch-down point). In Bayes' theorem, posterior probability is used instead of only using the most likely probability as the determining factor when making classification decisions. This may improve the minimum classification error rate. When calculating posterior probability, prior probability should be taken into consideration in addition to the most likely probability of the observation data.

In the example of current possible user inputs made at an edge region and at an actuable region (such as over a button or scrolling area), the posterior/prior probability is the likelihood that a user will provide a gesture at a non-edge region of the sensor panel in a particular situation. For example, when quickly flicking through images in a gallery application as in FIGS. 4a-4d, it may be considered very unlikely that a user would swipe to, for example, close the gallery application, so the prior probability of swiping from an edge to close the application is low. Similarly, if a user starts a swipe gesture by touching-down on a toggle button close to the edge of a touch-sensitive display as in FIGS. 5a-5d, the prior probability of the user swiping from an edge to, for example, move away from the settings menu is low because the user most likely wants to change the toggle button position/state.

On the other hand, consider a calculator application as in FIGS. 6a-6d where only tap inputs to the displayed virtual keys are recognised by the application. In this example, the prior probability of a swipe gesture to, for example, move away from the calculator application or close the calculator application is high, because the application does not support a swipe gesture and does not recognise it as an input to the calculator. Thus if the user makes a swipe gesture, it is very likely they do not wish to make an input to the calculator, and instead want to close the application/move away from the application.

By leveraging the context within which a user input gesture is performed, the intention of the gesture is better determined and may provide fewer unintended inputs where the input desired from a user gesture is ambiguous. The misclassification of user gesture inputs may be reduced by considering the context in which the user gesture input is made. The context may be the particular application or elements within an application/current view, the particular user gesture made, timing between a current user gesture and previous user gestures, or a combination of these.

It will be appreciated that other user interfaces may also be used with the present disclosure. The user interface may be a touch/hover sensitive input panel (e.g., touchpad) and/or display screen, for example a mobile electronic device with a capacitive or sense-at-a-distance display. As another example, a smart television configured to detect user gestures at a distance, for example using motion sensing, may be used according to embodiments disclosed herein.

FIG. 9a shows an example of an apparatus 900 in communication with a remote server. FIG. 9b shows an example of an apparatus 900 in communication with a "cloud" for cloud computing. In FIGS. 9a and 9b, apparatus 900 (which may be apparatus 100, 200 or 300) is also in communication with a further apparatus 902. The apparatus 902 may be an input sensor such as a touch-sensitive display, hover-sensitive display, touch panel or other 2-D or 3-D input sensing array. In other examples, the apparatus 900 and input sensor 902 may both be comprised within a device such as a portable communications device or PDA. In other examples the apparatus 900 and 902 may be separate and connected, for example by a wired or wireless connection. Communication may be via a communications unit, for example.

FIG. 9a shows the remote computing element to be a remote server 904, with which the apparatus 900 may be in wired or wireless communication (e.g. via the internet, Bluetooth, NFC, a USB connection, infra-red, or any other suitable connection as known to one skilled in the art). In FIG. 9b, the apparatus 900 are in communication with a remote cloud 910 (which may, for example, be the Internet, or a system of remote computers configured for cloud computing). For example, the current view may be of an application which is stored and running at a remote server 904 or cloud 910 and accessible by the first and/or second apparatus 900, 902. The dynamic assignment of respective probabilities may be done by the remote server/cloud.

Figure 10:
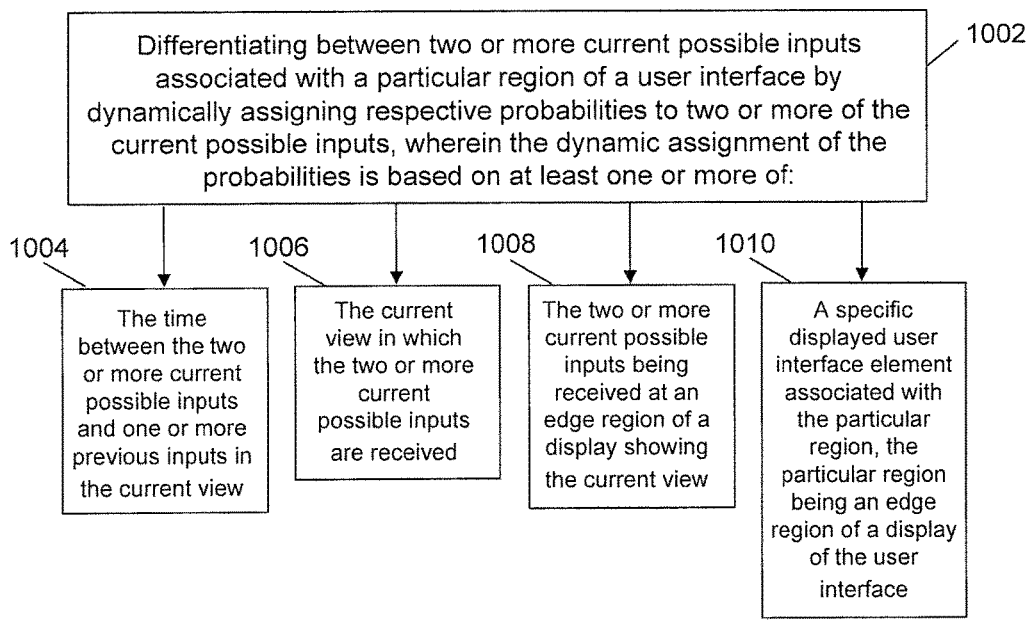
FIG. 10 illustrates a flowchart according to an example method of the present disclosure.

FIG. 10 illustrates a method according to an example embodiment of the present disclosure. The method comprises differentiating between two or more current possible inputs associated with a particular region of a user interface by dynamically assigning respective probabilities to two or more of the current possible inputs 1002. The dynamic assignment of the probabilities is based on at least one or more of: the time between the two or more current possible inputs and one or more previous inputs in the current view 1004; the current view in which the two or more current possible inputs are received 1006; the two or more current possible inputs being received at an edge region of a display showing the current view 1008; and a specific displayed user interface element associated with the particular region, the particular region being an edge region of a display of the user interface 1010.

Figure 11:
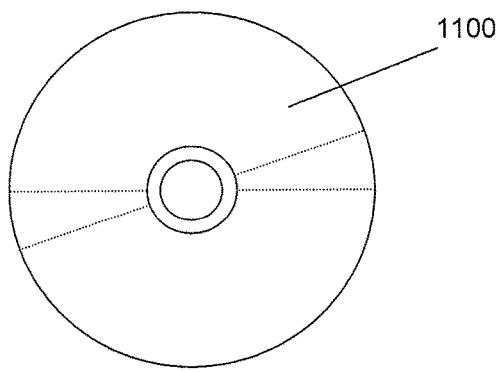
FIG. 11 illustrates schematically a computer readable medium providing a program.

FIG. 11 illustrates schematically a computer/processor readable medium 1100 providing a program according to an embodiment. In this example, the computer/processor readable medium is a disc such as a Digital Versatile Disc (DVD) or a compact disc (CD). In other embodiments, the computer readable medium may be any medium that has been programmed in such a way as to carry out the functionality herein described. The computer program code may be distributed between the multiple memories of the same type, or multiple memories of a different type, such as ROM, RAM, flash, hard disk, solid state, etc.

It will be appreciated that, where a swipe user input is provided in the above examples, a flick user input may be provided in other examples. Similarly, where a flick is provided in the above examples, a swipe may be provided in other examples. In some examples, both a swipe and a flick may be considered to be slide user inputs. In certain examples, slide, swipe, flick and/or other gestures may be made by controlling a mouse pointer on a screen; a stylus, pen or finger interacting with a touch or hover sensitive sensor pad/display screen; or a motion sensor detecting a user gesture, for example.

In some examples, a swipe may be considered a user input which touches down on a display, moves/drags in a direction across the display, stops and then lifts off the display, whereas a flick may be considered a user input which touches down on a display, moves in a direction across the display and lifts off the display whilst continuing the translational movement. Such examples may input made via a pressure-sensitive sensor pad/display screen. A pressure sensitive input device may detect differences in applied pressure, and may be sensitive to both the speed of movement and the speed of touching on and lifting off the sensor/display by detecting, for example, a decrease in applied pressure with movement across the sensor as a finger/stylus is lifted off the sensor.

In some examples, a swipe may be considered a user input which starts (e.g., by touching down on a display/pressing a mouse button), moves/drags across the display with increasing speed and then with decreasing speed, before ending (e.g., by lifting off the display or releasing a mouse button), whereas a flick may be considered a user input which starts, then moves in a direction across the display with increasing speed. Such examples include those which can detect the speed of movement across the display/sensor, such as those in which input is made via a non-pressure-sensitive touch or hover sensor pad/display screen, examples in which input is made via a displayed pointer or cursor controlled using a peripheral device such as a mouse or trackball, or examples in which a user's gestures are detected by a motion detector.

Other embodiments depicted in the figures have been provided with reference numerals that correspond to similar features of earlier described embodiments. For example, feature number 100 can also correspond to numbers 200, 300 etc. These numbered features may appear in the figures but may not have been directly referred to within the description of these particular embodiments. These have still been provided in the figures to aid understanding of the further embodiments, particularly in relation to the features of similar earlier described embodiments.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to example embodiments thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An apparatus comprising:
   at least one processor; and
   at least one memory including computer program code,
   the at least one memory and the computer program code configured to, with the at least one processor, cause the apparatus to perform at least the following:
   for a current user input comprising one of two or more current possible user inputs, differentiate between the two or more current possible user inputs associated with a particular region of a user interface by assigning respective probabilities to two or more of the current possible user inputs, wherein the assigning of the probabilities comprises differently adjusting probabilities of each of the two or more of the current possible user inputs based on at least:
      the time between the current user input comprising one of the two or more current possible user inputs and an immediately preceding previous user input in the current view,
   wherein the assigning of the probabilities further comprises:
      as the time between the current user input and the immediately preceding previous user input decreases, (1) proportionally increasing the probability assigned to a current possible user input being an input that would cause an effect within the current view with the probability being proportionally increased in proportion to the time between the current user input and the immediately preceding previous user input and (2) proportionally decreasing the probability assigned to the current possible user input being an input that would cause an effect outside the current view with the probability being proportionally decreased in proportion to the time between the current user input and the immediately preceding previous user input; and
      as the time between the current user input and the immediately preceding previous user input increases, (1) proportionally decreasing the probability assigned to the current possible user input being an input that would cause an effect within the current view with the probability being proportionally decreased in proportion to the time between the current user input and the immediately preceding previous user input and (2) proportionally increasing the probability assigned to the current possible user input being an input that would cause an effect outside the current view with the probability being proportionally increased in proportion to the time between the current user input and the immediately preceding previous user input; and perform a function corresponding to the current possible user input with the highest assigned probability of the two or more of the current possible user inputs, each of the two or more current possible user inputs having a function associated therewith that is to be performed in an instance in which the respective current possible user input has the highest assigned probability.

2. The apparatus of claim 1 wherein the assigning the probabilities is based on a current view; the current view being an open application, an open settings menu, or a desktop view.

3. The apparatus of claim 1 wherein the current possible user inputs comprise one or more respective user inputs which would close a current open application, exit the current view, scroll within the current view or toggle functionality provided by the current view.

4. The apparatus of claim 1 wherein the current possible user inputs comprise a user input causing an effect outside the current view or application which:
if assigned the highest probability, would close the current open application, exit the current view, or move away from the current view.

5. The apparatus of claim 1 wherein the current possible user inputs comprise a user input causing an effect within the current view or application which:
if assigned the highest probability, would scroll within the current view, toggle a user interface element within the current view, or actuate a user interface element within the current view.

6. The apparatus of claim 1 wherein the two or more current possible user inputs are:
a slide starting from an edge region of a display of the user interface causing one or more of closing the current open application, exiting the current view, or moving away from the current view; and
a slide starting on a display within an edge region of a display of the user interface causing one or more of scrolling within the current view, toggling a user interface element within the current view, or actuating a user interface element within the current view.

7. The apparatus of claim 1 wherein the apparatus is configured to differentiate by assigning respective probabilities based on the time between the two or more current possible user inputs and one or more previous user inputs in the current view by receiving the two or more current possible user inputs at an edge region of a display of the user interface showing the current view.

8. The apparatus of claim 1 wherein the apparatus is configured to differentiate by assigning respective probabilities based on the time between the two or more current possible user inputs and one or more previous user inputs in the current view, wherein the one or more previous user inputs are made during the same open instance of the current view as the two or more current possible user inputs.

9. The apparatus of claim 1 wherein the apparatus is configured to differentiate by assigning respective probabilities based on the time between the two or more current possible user inputs and one or more previous user inputs in the current view by receiving the two or more current possible user inputs at an edge region of a display of the user interface showing the current view; and varying the actuable area of the edge region of the display according to the time between the two or more current possible user inputs and the immediately preceding previous user.

10. The apparatus of claim 1 wherein the apparatus is configured to differentiate by assigning respective probabilities based on the current view in which the two or more current possible user inputs are received by at least one of:
increasing the probability assigned to a current possible user input being an input that would cause an effect within the current view, if the current possible user input is a user input validly recognized by the current view;
decreasing the probability assigned to a current possible user input being an input that would cause an effect within the current view, if the current possible user input is not a user input validly recognized by the current view;
increasing the probability assigned to a current possible user input being an input that would cause an effect outside the current view, if the current possible user input is not a user input validly recognized by the current view; and
decreasing the probability assigned to a current possible user input being an input that would cause an effect outside the current view, if the current possible user input is a user input validly recognized by the current view.

11. The apparatus of claim 1 wherein the apparatus is configured to differentiate by assigning respective probabilities based on the two or more current possible user inputs being received at an edge region of a display of the user interface showing the current view by:
assigning a higher probability to a current possible user input performing a function within the current view than the probability assigned to a current possible user input performing a function outside the current view.

12. The apparatus of claim 1 wherein the apparatus is configured to differentiate by assigning respective probabilities based on a specific displayed user interface element associated with an edge region of a display of the user interface by:
assigning a higher probability to a current possible user input actuating the user interface element than the probability assigned to a current possible user input interacting with the edge region of the display.

13. The apparatus of claim 1 wherein the apparatus is configured to receive an ambiguous user input action, the ambiguous user input action providing the two or more current possible user inputs to the user interface.

14. The apparatus of claim 1 wherein the two or more current possible user inputs are made via one or more of: a touch input sensor, a hover input sensor, a pointer control device, a mouse, a trackball, a joystick, a wand, a remote controller, or a motion sensor input device.

15. The apparatus of claim 1 wherein the assigning the probabilities is based on an open application as the current view, the open application being: a gallery application; a social media application; a web browser; a productivity application; or a media player.

16. The apparatus of claim 1 wherein the apparatus is a portable electronic device, a smartphone, a mobile phone, a laptop computer, a tablet computer, a surface computer, a pen-based computer, a stylus-based computer, a television, a personal digital assistant, a digital camera, a watch, a navigation device, a non-portable electronic device, a monitor, a desktop computer, a server, a household appliance, a refrigerator, a cooker, a cooling/heating system, or a module for one or more of the same.

17. A method, the method comprising:
for a current user input comprising one of two or more current possible user inputs, differentiating between the two or more current possible user inputs associated with a particular region of a user interface by assigning respective probabilities to two or more of the current possible user inputs, wherein the assigning of the probabilities comprises differently adjusting probabilities of each of the two or more of the current possible user inputs based on at least:
the time between the current user input comprising one of the two or more current possible user inputs and an immediately preceding previous user input in the current view,
wherein the assigning of the probabilities further comprises:
as the time between the current user input and the immediately preceding previous user input decreases, (1) proportionally increasing the probability assigned to a current possible user input being an input that would cause an effect within the current view with the probability being proportionally increased in proportion to the time between the current user input and the immediately preceding previous user input and (2) proportionally decreasing the probability assigned to the current possible user input being an input that would cause an effect outside the current view with the probability being proportionally decreased in proportion to the time between the current user input and the immediately preceding previous user input; and
as the time between the current user input and the immediately preceding previous user input increases, (1) proportionally decreasing the probability assigned to the current possible user input being an input that would cause an effect within the current view with the probability being proportionally decreased in proportion to the time between the current user input and the immediately preceding previous user input and (2) proportionally increasing the probability assigned to the current possible user input being an input that would cause an effect outside the current view with the probability being proportionally increased in proportion to the time between the current user input and the immediately preceding previous user input; and
performing a function corresponding to the current possible user input with the highest assigned probability of the two or more of the current possible user inputs, each of the two or more current possible user inputs having a function associated therewith that is to be performed in an instance in which the respective current possible user input has the highest assigned probability.

18. A computer readable medium comprising computer program code stored thereon, the computer readable medium and computer program code being configured to, when run on at least one processor, perform at least the following:
for a current user input comprising one of two or more current possible user inputs, differentiate between the two or more current possible user inputs associated with a particular region of a user interface by assigning respective probabilities to two or more of the current possible user inputs, wherein the assigning of the probabilities comprises differently adjusting probabilities of each of the two or more of the current possible user inputs based on at least:
the time between the current user input comprising one of the two or more current possible user inputs and an immediately preceding previous user input in the current view,
wherein the assigning of the probabilities further comprises:
as the time between the current user input and the immediately preceding previous user input decreases, proportionally increasing the probability assigned to a current possible user input being an input that would cause an effect within the current view with the probability being proportionally increased in proportion to the time between the current user input and the immediately preceding previous user input and proportionally decreasing the probability assigned to the current possible user input being an input that would cause an effect outside the current view with the probability being proportionally decreased in proportion to the time between the current user input and the immediately preceding previous user input; and
as the time between the current user input and the immediately preceding previous user input increases, proportionally decreasing the probability assigned to the current possible user input being an input that would cause an effect within the current view with the probability being proportionally decreased in proportion to the time between the current user input and the immediately preceding previous user input and proportionally increasing the probability assigned to the current possible user input being an input that would cause an effect outside the current view with the probability being proportionally increased in proportion to the time between the current user input and the immediately preceding previous user input; and
perform a function corresponding to the current possible user input with the highest assigned probability of the two or more of the current possible user inputs, each of the two or more current possible user inputs having a function associated therewith that is to be performed in an instance in which the respective current possible user input has the highest assigned probability.

* * * * *